United States Patent
Buschjohann et al.

(10) Patent No.: US 9,302,707 B2
(45) Date of Patent: Apr. 5, 2016

(54) CROSSMEMBER HAVING AN INTEGRATED SUPPORT FOR A DRIVE

(75) Inventors: Thomas Buschjohann, Nordstemmen (DE); Andreas Kiesel, Thalheim (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

(21) Appl. No.: 14/126,127

(22) PCT Filed: Jun. 25, 2012

(86) PCT No.: PCT/DE2012/000642
§ 371 (c)(1),
(2), (4) Date: Dec. 13, 2013

(87) PCT Pub. No.: WO2013/004209
PCT Pub. Date: Jan. 10, 2013

(65) Prior Publication Data
US 2014/0117654 A1    May 1, 2014

(30) Foreign Application Priority Data

Jul. 5, 2011 (DE) .......................... 10 2011 106 758
Nov. 25, 2011 (DE) .......................... 10 2011 119 342

(51) Int. Cl.
| | | |
|---|---|---|
| *B62D 21/11* | (2006.01) | |
| *B62D 21/03* | (2006.01) | |
| *B62D 21/17* | (2006.01) | |
| *B62D 29/00* | (2006.01) | |

(Continued)

(52) U.S. Cl.
CPC *B62D 21/11* (2013.01); *B60G 3/18* (2013.01); *B60K 7/0007* (2013.01); *B62D 21/03* (2013.01); *B62D 21/17* (2013.01); *B62D 29/008* (2013.01); *B62D 29/041* (2013.01); *B60K 1/02* (2013.01); *B60K 2007/0046* (2013.01); *B60K 2007/0061* (2013.01); *B60K 2007/0092* (2013.01)

(58) Field of Classification Search
CPC ...... B62D 21/11; B62D 21/03; B62D 29/041; B62D 21/17; B60G 3/18; B60K 2007/0061; B60K 2007/0092; B60K 7/007
USPC ........... 280/795, 797; 180/65.31, 65.51, 65.1, 180/65.25; 475/5, 149
See application file for complete search history.

(56) References Cited

U.S. PATENT DOCUMENTS

| | | | | |
|---|---|---|---|---|
| 2,085,738 | A | * | 7/1937 | Coleman ................. 280/124.107 |
| 6,269,902 | B1 | * | 8/2001 | Miyagawa .................... 180/312 |

(Continued)

FOREIGN PATENT DOCUMENTS

| | | |
|---|---|---|
| CN | 101 484 328 A | 7/2009 |
| DE | 10 2007 047402 B3 | 10/2008 |

(Continued)

OTHER PUBLICATIONS

International Search Report of PCT/DE2012/000642, mailed Oct. 26, 2012.

(Continued)

*Primary Examiner* — Karen Beck
(74) *Attorney, Agent, or Firm* — Collard & Roe, P.C.

(57) ABSTRACT

The invention relates to a crossmember, in particular the rear crossmember of a motor vehicle, for a multi-link suspension of the wheel, characterized in that the crossmember has a respective receiving arrangement for the drive of each of the wheels.

34 Claims, 6 Drawing Sheets

Figure 1:
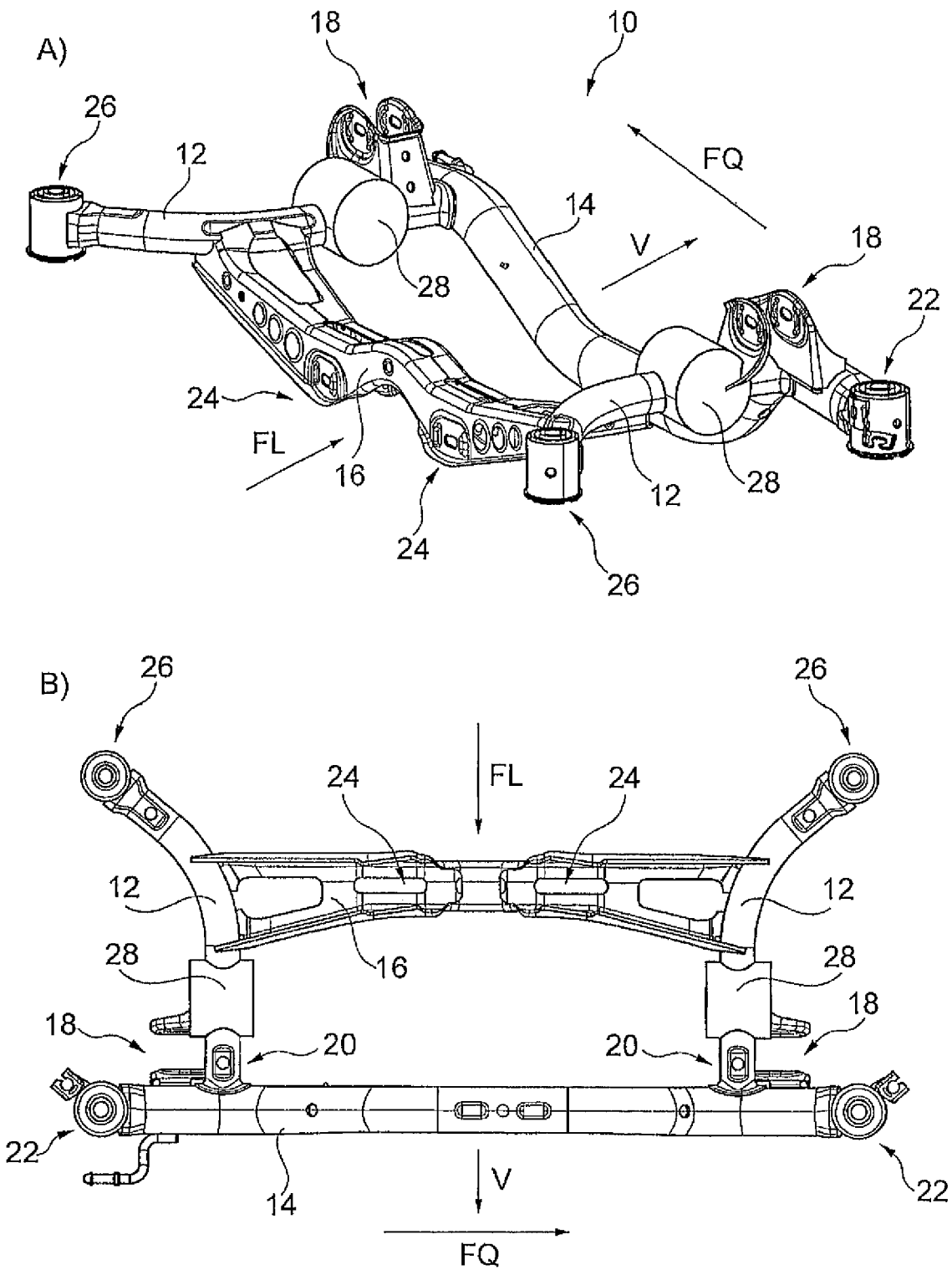

(51) Int. Cl.
B62D 29/04 (2006.01)
B60G 3/18 (2006.01)
B60K 7/00 (2006.01)
B60K 1/02 (2006.01)

(56) References Cited

U.S. PATENT DOCUMENTS

| | | | |
|---|---|---|---|
| 7,520,514 B2* | 4/2009 | Ogawa et al. | 280/124.109 |
| 7,584,815 B2* | 9/2009 | Ogawa et al. | 180/312 |
| 7,708,103 B2* | 5/2010 | Okuyama et al. | 180/299 |
| 7,946,377 B2* | 5/2011 | Frasch et al. | 180/312 |
| 8,083,244 B2 | 12/2011 | Buschjohann et al. | 280/124.109 |
| 2003/0230443 A1* | 12/2003 | Cramer et al. | 180/65.5 |
| 2004/0222030 A1* | 11/2004 | Szalony et al. | 180/311 |
| 2007/0024044 A1* | 2/2007 | Ogawa et al. | 280/788 |
| 2008/0315571 A1* | 12/2008 | Cariou et al. | 280/781 |
| 2009/0212521 A1* | 8/2009 | Steffens et al. | 280/124.109 |
| 2009/0243272 A1* | 10/2009 | Tanaka et al. | 280/794 |
| 2010/0025131 A1* | 2/2010 | Gloceri et al. | 180/65.28 |
| 2012/0104739 A1* | 5/2012 | Buschjohann et al. | 280/781 |
| 2013/0113176 A1* | 5/2013 | Eguchi et al. | 280/124.107 |
| 2013/0168939 A1* | 7/2013 | Buschjohann et al. | 280/124.109 |
| 2013/0181485 A1* | 7/2013 | Rumpel et al. | 296/203.04 |
| 2013/0300157 A1* | 11/2013 | Leibl | 296/204 |
| 2014/0015284 A1* | 1/2014 | Mildner et al. | 296/193.08 |
| 2014/0117654 A1* | 5/2014 | Buschjohann et al. | 280/795 |
| 2014/0262588 A1* | 9/2014 | Bruns | B60K 1/00 180/291 |
| 2015/0014955 A1* | 1/2015 | Leibl | 280/124.107 |

FOREIGN PATENT DOCUMENTS

| | | |
|---|---|---|
| DE | 20 2008 017274 U1 | 5/2009 |
| DE | 10 2009 015414 A1 | 9/2010 |
| DE | 10 2011 012249 A1 | 8/2012 |
| EP | 1 050 449 A1 | 11/2000 |

OTHER PUBLICATIONS

Fahrenwaldt, Hans J. / Schuler, Volkmar, Praxiswissen Schweilβtechnik (Practical Knowledge of Welding Technology) Berlin-Heidelberg, 2d revised and expanded edition, 2006, pp. 127-129.

Fahrenwaldt, Hans J. / Schuler, Volkmar, Praxiswissen Schweilβtechnik: Werkstoffe, Prozesse, Fertigung (Practical Knowledge of Welding Technology: Materials, Processes, Manufacturing), Germany, 2nd, revised and expanded edition, 2006, pp. 127-129.

* cited by examiner

CROSSMEMBER HAVING AN INTEGRATED SUPPORT FOR A DRIVE

CROSS REFERENCE TO RELATED APPLICATIONS

This application is the National Stage of PCT/DE2012/000642 filed on Jun. 25, 2012, which claims priority under 35 U.S.C. §119 of German Application No. 10 2011 106 758.6 filed on Jul. 5, 2011, and German Application No. 10 2011 119 342.5 filed on Nov. 25, 2011, the disclosures of which are incorporated by reference. The international application under PCT article 21(2) was not published in English.

The invention relates to a crossmember, particularly a rear crossmember of a motor vehicle, for multi-link suspension of the wheels.

Such crossmembers, which are also known under other names, such as axle subframe or chassis subframe, integral frame or auxiliary frame, are attached, after they have been provided with assemblies or auxiliary assemblies, to parts of the motor vehicle superstructure, for example to the body and/or to side members of a motor vehicle, as pre-assembled units or modules.

The invention is based on the task of configuring a crossmember on the basis of requirements regarding installation, body stress, comfort, and rigidity. The invention is furthermore based on the task of configuring a crossmember having improved properties in terms of driving dynamics, and improved properties in terms of comfort and acoustics. The invention is furthermore based on the task of making a crossmember less sensitive to corrosion, easier to process, and so that it can be produced in more cost-advantageous and simple manner. Furthermore, a crossmember of the type stated initially is to be further developed in such a manner that its weight is comparatively reduced, with simultaneously greater ability to withstand stress, if possible. Furthermore, a more compact overall construction of the crossmember is to be obtained. Furthermore, an axle, preferably a rear axle, is to be made available with a crossmember, which axle can be driven in advantageous manner. The crossmember is to be configured in such a manner that installation and maintenance as well as repair are simplified. The crossmember is supposed to demonstrate sufficient strength at the connection points and to withstand long-term stresses. It is supposed to meet great demands regarding rigidity values, inherent frequencies, and crash behavior, to be as light as possible, to allow production in cost-advantageous manner, with the smallest possible number of individual parts and the smallest possible number of weld seams, to cover as many chassis components as possible and to allow setting them, to take up as little construction space as possible, to damp transfer of noises, particularly road noises, and vibrations, particularly wheel vibrations, and to allow easy installation and removal.

According to the invention, at least one of these tasks is accomplished with a crossmember, particularly a rear crossmember of a motor vehicle, for multi-link suspension of the wheels, in that the crossmember has a receiving arrangement, in each instance, for the drive of each of the wheels.

It is advantageous if the crossmember itself has a basic body that can be configured in the manner of a frame, particularly with reinforcement struts, or with an extensively closed basic surface, provided only with the required recesses or accommodations for attachment/mounting of chassis components.

It can be advantageous if the crossmember comprises two side members that are connected with one another by way of at least one transverse member, whereby a receiving arrangement is disposed on each side member.

It is practical if the two side members are connected, by way of two transverse members, to form a frame-like crossmember. It can be advantageous if the side members are configured in one piece with the transverse members. However, it can also be advantageous if the side members are connected with the transverse members by way of other joining methods, particularly connected with one another by means of welding.

It can be practical if at least one transverse member has at least one receiving arrangement for additional fixation or holding of at least one drive.

It can be advantageous if the front transverse member, in the direction of travel, has at least one receiving arrangement for fixation or holding of at least one drive.

It can be advantageous if the receiving arrangement of the transverse member is disposed in the central region of the transverse member.

It can be advantageous if the receiving arrangement of the transverse member is disposed on that side of the transverse member that is closest to the axis of rotation of the wheel.

It can be advantageous if the receiving arrangement of the transverse member is disposed on that side of the transverse member that faces toward the opposite transverse member.

It can be practical if the receiving arrangement of the transverse member has at least one holder per drive, whereby the holder is preferably configured in the manner of a clamp. This clamp can then advantageously be placed around the drive or around the housing of the drive, for holding of same.

It can be advantageous if the receiving arrangement is configured in one or multiple parts. A multi-part receiving arrangement has the advantage that at first, a part of the receiving arrangement can be connected with the crossmember, preferably with the side member, and subsequently, the drive is inserted into this part of the receiving arrangement, and finally, the receiving arrangement can be closed by means of one or more further parts.

It can be advantageous if at least a part of the receiving arrangement is connected with the crossmember, at least in part, preferably with the side member.

For specific cases of use, it can be advantageous if the receiving arrangement or the housing of the drive is attached, at least in part, in and/or on the crossmember, preferably in and/or on the side member, or on the receiving arrangement present on the side member, only by means of gluing. For certain application cases, it can be practical if the receiving arrangement or the housing of the drive is additionally attached, at least in part, in and/or on the crossmember, preferably in and/or on the side member, or on the receiving arrangement present on the side member, by means of gluing. For individual cases of use, it can be advantageous if the receiving arrangement or the housing of the drive is attached, at least in part, in and/or on the crossmember, preferably in and/or on the side member, or on the receiving arrangement present on the side member, only by means of welding, particularly by means of resistance spot welding. For specific application cases, it can be advantageous if the receiving arrangement or the housing of the drive is additionally attached, at least in part, in and/or on the crossmember, preferably in and/or on the side member, or on the receiving arrangement present on the side member, by means of welding, particularly by means of resistance spot welding. For certain cases of use it can be advantageous if the receiving arrangement or the housing of the drive is attached, at least in part, in and/or on the crossmember, preferably in and/or on the side member, or on the receiving arrangement present on the side member, only by means of crimping of predetermined regions of the crossmember. For further cases of use, it can be practical if the receiving arrangement or the housing of the drive is additionally attached, at least in part, in and/or on the crossmember, preferably in and/or on the side member, or on the receiving arrangement present on the side member, by means of crimping of predetermined regions of the crossmember. For specific cases of use it can be advantageous if at least the receiving arrangement, at least in part, or the housing of the drive, at least in part, is attached in and/or on the crossmember, preferably in and/or on the side member, or on the receiving arrangement present on the side member, only by means of clinching or, particularly, by means of clinching. For different application cases, it can be advantageous if the receiving arrangement or the housing of the drive is additionally attached, at least in part, in and/or on the crossmember, preferably in and/or on the side member, or on the receiving arrangement present on the side member, by means of clinching buttoning or, particularly, by means of clinching. A person skilled in the art will find an overview of buttoning, or particularly clinching in Fahrenwaldt, Hans J. Schuler, Volkmar: Praxiswissen Schweißtechnik [Practical Knowledge of Welding Technology], Berlin—Heidelberg, $2^{nd}$ revised and expanded edition, 2006, pp. 127-129. For different cases of use, it can be practical if the receiving arrangement or the housing of the drive is attached, at least in part, in and/or on the crossmember, preferably in and/or on the side member, or on the receiving arrangement present on the side member, only by means of punch riveting. For different cases of use it can be practical if the receiving arrangement or the housing of the drive is additionally attached, at least in part, in and/or on the crossmember, preferably in and/or on the side member, or on the receiving arrangement present on the side member, by means of punch riveting. For other different cases of use, it can be advantageous if the receiving arrangement or the housing of the drive is attached, at least in part, in and/or on the crossmember, preferably in and/or on the side member, or on the receiving arrangement present on the side member, only by means of a screwed connection. For yet other cases of use, it can be advantageous if the receiving arrangement or the housing of the drive is additionally attached, at least in part, in and/or on the crossmember, preferably in and/or on the side member, or on the receiving arrangement present on the side member, by means of a screwed connection.

Of course, the crossmember, which is preferably cast in one piece, or the side member, which is preferably cast in one piece, is designed in such a manner or has a geometry in the region of the receiving arrangement to be accommodated that the selected connection method can easily be applied. In the case of a flange-like receiving arrangement present on the side member, for example, a screwed connection with the drive or with the housing of the drive can be advantageous.

It can be advantageous if at least a part of the receiving arrangement is configured in one piece with the crossmember, preferably with the side member.

It can be advantageous if at least a part of the receiving arrangement is connected with the crossmember, preferably with the side member, preferably in non-releasable manner.

It can be advantageous if at least a part of the receiving arrangement is accommodated in, particularly integrated into the crossmember, preferably in the side member, at least in part.

It can be advantageous if at least a part of the receiving arrangement is formed, at least in part, by the crossmember, preferably by means of the side member.

As a result, the crossmember, preferably the side member, along with the receiving arrangement, can be produced in particularly stable as well as simple and cost-advantageous manner.

It can be practical if the receiving arrangement comprises at least a part of a housing for the drive and/or if at least a part of the receiving arrangement is configured as a housing for the drive. It is advantageous if the receiving arrangement forms a hollow body.

However, it can also be advantageous if the receiving arrangement is connected at least with a part of the housing for the drive.

It can be practical if the receiving arrangement present on the side member is configured in the manner of a flange, particularly in the manner of a ring flange. The drive or the housing of the drive can be joined to a receiving arrangement configured in this manner, in particularly simple manner.

It can be advantageous, for certain cases of use, if at least a part of the housing for the drive is configured in cylindrical shape. For specific cases of use, it can be advantageous if at least a part of the housing for the drive is configured to be tubular. For other cases of use, it can be advantageous if at least a part of the housing for the drive is configured to be sleeve-shaped, and for yet other cases of use, it can be advantageous if at least a part of the housing for the drive is configured to be box-shaped.

It can be advantageous if the drive is held or fixed in place on or in the crossmember at multiple locations, particularly on one side on the side member, by way of the receiving arrangement, and on the other side on the transverse member, by way of the receiving arrangement.

It can be practical if the axes of rotation of wheel and drive coincide, in other words are disposed coaxially.

For specific application cases, it can be advantageous if the receiving arrangement is disposed above the wheel center, seen in the transverse vehicle direction. For certain application cases, it can be advantageous if the receiving arrangement is disposed below the wheel center, seen in the transverse vehicle direction. For some application cases it can be advantageous if the receiving arrangement is disposed at the height of the wheel center, seen in the transverse vehicle direction.

For specific purposes of use, it can be advantageous if the receiving arrangement is disposed in front of the wheel center, seen in the longitudinal vehicle direction. For certain purposes of use, it can be advantageous if the receiving arrangement is disposed behind the wheel center, seen in the longitudinal vehicle direction. For some purposes of use, it can be advantageous if the receiving arrangement is disposed at the height of the wheel center, seen in the longitudinal vehicle direction.

However, it can also be advantageous if the side members and/or the receiving arrangements have one or more bores, channels or recesses that form brake lines and/or cooling lines or through which brake lines and/or cooling lines are passed.

It can be advantageous if at least a part of the receiving arrangement is produced using a casting process.

It can be practical if the crossmember and/or preferably the side member is/are produced as a cast component, at least with a part of the receiving arrangement.

It can be practical if the crossmember and/or preferably the side member is/are produced as a one-piece cast component, at least with a part of the receiving arrangement.

For specific cases of use, it can be advantageous if at least a part of the receiving arrangement is connected with the crossmember with material fit, whereby the receiving arrangement is preferably produced separately and integrated into the crossmember, which is preferably cast in one piece. A material-fit connection is a connection in which the components, here particularly the crossmember and receiving arrangement, are connected with one another so intimately that the forces that occur during operation are transferred by means of cohesion and adhesion. Such a connection is non-releasable, i.e. it can only be separated again by means of destruction of the joined components, or can be broken down again into its components by means of destruction of the connection element.

For different application cases, it can be advantageous if the receiving arrangement is only cast in, in and/or on the crossmember, at least in part. For further application cases, it can be advantageous if the receiving arrangement is additionally cast in, in and/or on the crossmember, at least in part.

For further cases of use, it can be advantageous if the receiving arrangement is only cast around, in and/or on the crossmember, at least in part. For individual cases of use, however, it can also be advantageous if the receiving arrangement is additionally cast around, cast in and/or cast on, in the crossmember, at least in part.

For different cases of use, it can also be advantageous if the receiving arrangement is only cast on, in and/or on the crossmember, at least in part. For individual cases of use, however, it can also be advantageous if the receiving arrangement is additionally cast on, in and/or on the crossmember, at least in part.

In this way, an essentially monolithic component, as a whole is obtained, which has optimized strength values in the region of the receiving arrangement.

A further development of the invention provides that the crossmember can be a front crossmember or a rear crossmember, whereby in a preferred embodiment, this crossmember has receiving sites or recesses for attaching or mounting wheel guide elements, such as transverse links or trailing arms, and receiving sites for attaching the crossmember as a prefinished unit, together with all the pre-assembled assemblies, on the vehicle superstructure. Furthermore, it can be advantageous if the crossmember that is cast in one piece has receiving sites or recesses preferably for attaching a stabilizer, for mounting a torque support or for mounting a hinged support. These receiving sites or recesses can be connected with one another, in one piece, by means of the casting process.

In total, the weight can be reduced, with a simultaneously great ability of the crossmember to withstand stress, if at least a part of the crossmember, preferably of the side member, and/or of the receiving arrangement is produced, at least in part, from a light construction material. For specific application cases, a light metal can be advantageous as a light material. For other application cases, a plastic can be advantageous as a light material. For yet other application cases, a composite of light metal and plastic can be advantageous. Thus, a more compact overall construction can be obtained, particularly of a drivable rear axle having a crossmember according to the invention.

The light metal can consist of aluminum, magnesium, zinc, or of alloys with one or more of these metals. For certain purposes of use, one or more parts of the crossmember and/or of the receiving arrangement can advantageously also consist of steel or iron, particularly of cast steel or cast iron. For specific purposes of use, a sheet-metal construction can be advantageous for one or more parts of the crossmember.

It can be advantageous if the plastic is a polyamide, particularly a fiberglass-reinforced polyamide. However, a plastic composed of polypropylene, particularly fiberglass-reinforced polypropylene, can also be advantageously used. For specific purposes of use, it can be advantageous if a plastic is used that is known under the name Ultramid® A3WG10 CR.

The side members, which are connected with one another by way of the transverse member(s), can advantageously be connected with the transverse member(s), at least in part, by means of gluing, by means of welding, particularly by means of resistance spot welding, by means of crimping of predetermined regions of the crossmember, by means of buttoning or particularly clinching, by means of punch riveting and/or by means of a screwed connection.

It can be advantageous if the transverse members are configured as profiles. It can be advantageous if the front transverse member, in the direction of travel, is an extruded profile. It can be advantageous if the rear transverse member, in the direction of travel, is an interior high-pressure formed component, preferably one that is subsequently machined.

It is advantageous if transverse member and side member form a hybrid component composed of plastic and light metal. It can be advantageous if the side members consist of plastic and the transverse member(s) consist(s) of light metal, or vice versa. The side members can advantageously be connected with the transverse member(s) by way of an injection-molding process. It is practical if the side members and/or the transverse member(s) is/are configured in such a manner that the connection preferably takes place during the injection-molding process, by means of shape fit.

It can be advantageous if the transverse member(s) is/are produced, at least in part, from a light material, preferably from light metal, from plastic or a composite of light metal and plastic.

It can be advantageous if at least a part of the receiving arrangement has one or more reinforcement elements, particularly reinforcement ribs, belts, beads, bulges, crosspieces and/or perforations, but preferably multiple reinforcement ribs.

It is practical if one or more reinforcement elements make a transition into the crossmember, preferably into the side member.

The drive can advantageously be a drive motor. In particular, it can be advantageous if the drive is an electric motor.

It is advantageous if the side member furthermore has a shock absorber receiving site for attaching a shock absorber, particularly connected in one piece with the side member, preferably produced by means of a casting method.

It can be advantageous if the side member furthermore has a spring support or receiving site for receiving a corresponding spring, particularly a helical spring, particularly connected in one piece with the side member, preferably produced by means of a casting method.

These aforementioned receiving sites can also, however, depending on the purpose of use, be connected with the crossmember or with the links by means of a screwed connection, welding, material removal, or the like.

It can be particularly practical if at least a part of the receiving arrangement or a cast component of the crossmember is produced by means of squeeze-casting, counter-pressure die-casting (CPC), high-pressure die-casting, particularly by means of thixocasting, rheocasting, and low-pressure sand-casting, or by means of gravity die-casting.

It can also be advantageous if at least a part of the receiving arrangement or of a cast component of the crossmember is produced using the injection-molding method.

It can also be practical if at least a part of the receiving arrangement or of a cast component of the crossmember is produced using the sand-casting method.

It can be advantageous if the crossmember is part of a driven rear axle, particularly of a driven multi-link rear axle, of a two-axle or multi-axle motor vehicle. In this connection, it can be advantageous if the multi-link rear axle is configured as a control blade rear axle. It is advantageous if the multi-link suspension is configured with one longitudinal link and three transverse links. In this way, an all-wheel drive can be implemented, in particular, in simple manner, whereby the front axle, in contrast to the aforementioned rear axle, can be driven using an internal combustion engine, for example. It is advantageous that the crossmember according to the invention can be used in an electric vehicle or a hybrid vehicle. A vehicle having a conventional front-wheel drive and a rear wheel drive according to the invention is preferred as a hybrid vehicle.

It can be advantageous if the crossmember, which is preferably cast in one piece, has the side members, which are preferably cast in one piece, and/or the transverse member(s), which is/are preferably cast in one piece, for attaching or mounting wheel guide elements, such as transverse or longitudinal links, and receiving sites for attaching the crossmember as a prefinished unit, together with pre-assembled assemblies, on the vehicle superstructure. Furthermore, it can be advantageous if the crossmember, which is preferably cast in one piece, the side members, which are preferably cast in one piece, and/or the transverse member(s), which is/are preferably cast in one piece, have receiving sites or recesses, preferably for attaching a stabilizer, for mounting a torque support and/or for mounting a swivel support. These receiving sites or recesses can be connected with one another, in one piece, by means of the casting process.

The crossmember, preferably the side member, can advantageously be produced together with at least one part of the receiving arrangement, using a casting method. For specific purposes of use, it can also be practical if the side member is produced from one or more injection-molded, extruded, continuously cast or cast profiles. For certain application cases, it can be advantageous if at least a part of the receiving arrangement is produced from at least one injection-molded, extruded, continuously cast or cast profile.

The crossmember(s) of the crossmember can advantageously be produced from an injection-molded, extruded, continuously cast or cast profile.

The receiving arrangement can advantageously be disposed on the side member at a distance from the transverse member(s), preferably between the transverse members.

It can be advantageous if the crossmember has receiving sites, preferably in the form of a bushing, for attachment means for attaching the crossmember on the vehicle superstructure.

It can be advantageous if the longitudinal axis or axis of symmetry of the receiving arrangement is disposed to be parallel to the axis of rotation of the wheels or coincides with this axis.

It can be advantageous if the receiving arrangement present on the side member is disposed close to the wheel.

It can be advantageous if the greatest part of the receiving arrangement or of the housing of the drive is disposed to be directed inward, proceeding from the connection point between receiving arrangement and crossmember, in other words facing away from the corresponding drivable wheel.

For specific applications, it can be advantageous if the longitudinal axis of the receiving arrangement is disposed above the crossmember or the side member, seen in the transverse vehicle direction. For some applications, it can be advantageous if the longitudinal axis of the receiving arrangement is disposed below the crossmember or the side member, seen in the transverse vehicle direction. For many applications, it can be advantageous if the longitudinal axis of the receiving arrangement is disposed at the height of the crossmember or of the side member, seen in the transverse vehicle direction.

It can be advantageous if the receiving arrangement for the drive or of the housing for the drive has a volume of 500 $cm^3$ to 2000 $cm^3$.

It can be advantageous if the diameter/length ratio of the receiving arrangement or of the housing for the drive amounts to between 0.25:1 and 1.5:1.

It can be practical if the side member has at least some of the following receiving sites, which are preferably connected with the side member in one piece:
receiving sites for mounting an upper transverse link, particularly a roll-over strut,
receiving sites for mounting a lower transverse link, particularly a tie rod,
receiving sites for mounting a stabilizer,
receiving sites, preferably disposed at the ends, for attaching the crossmember to the body or to the superstructure.

Figure 2:
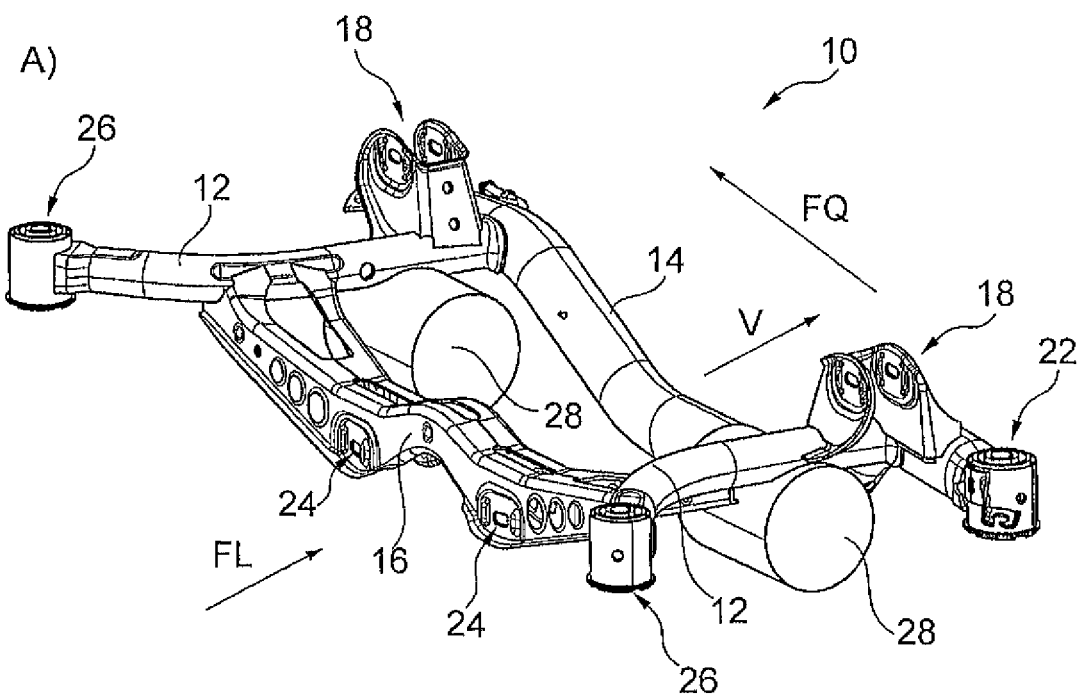
Figure 2:
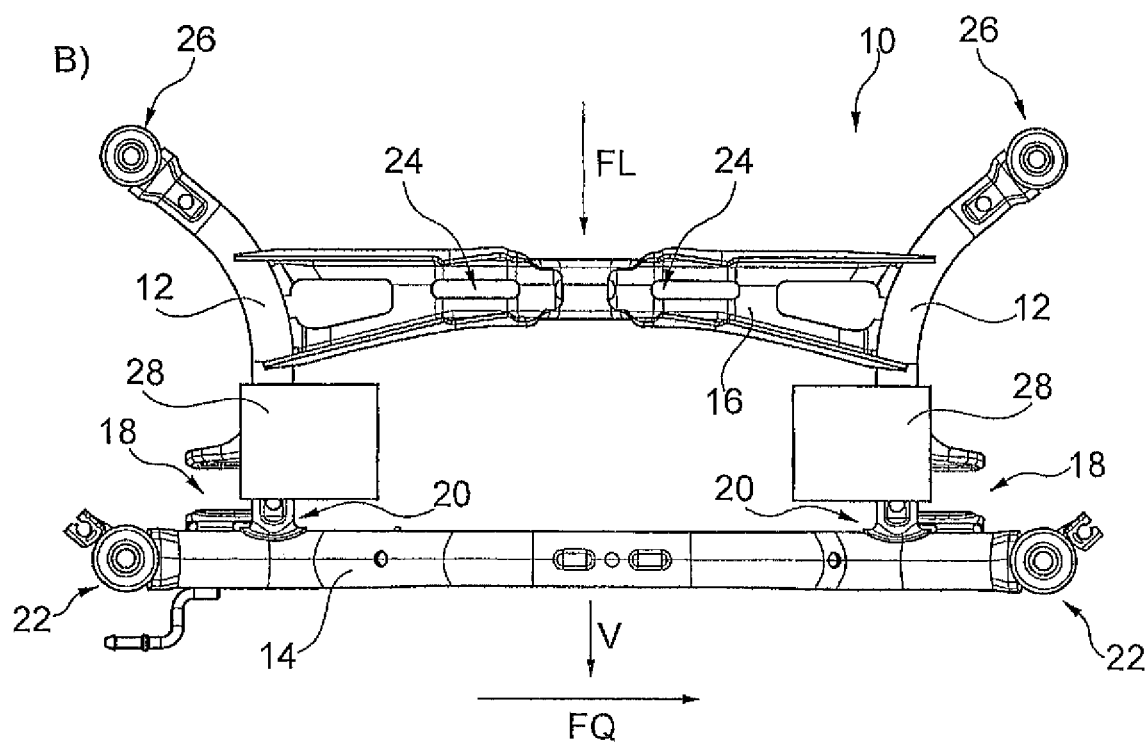
Figure 3:
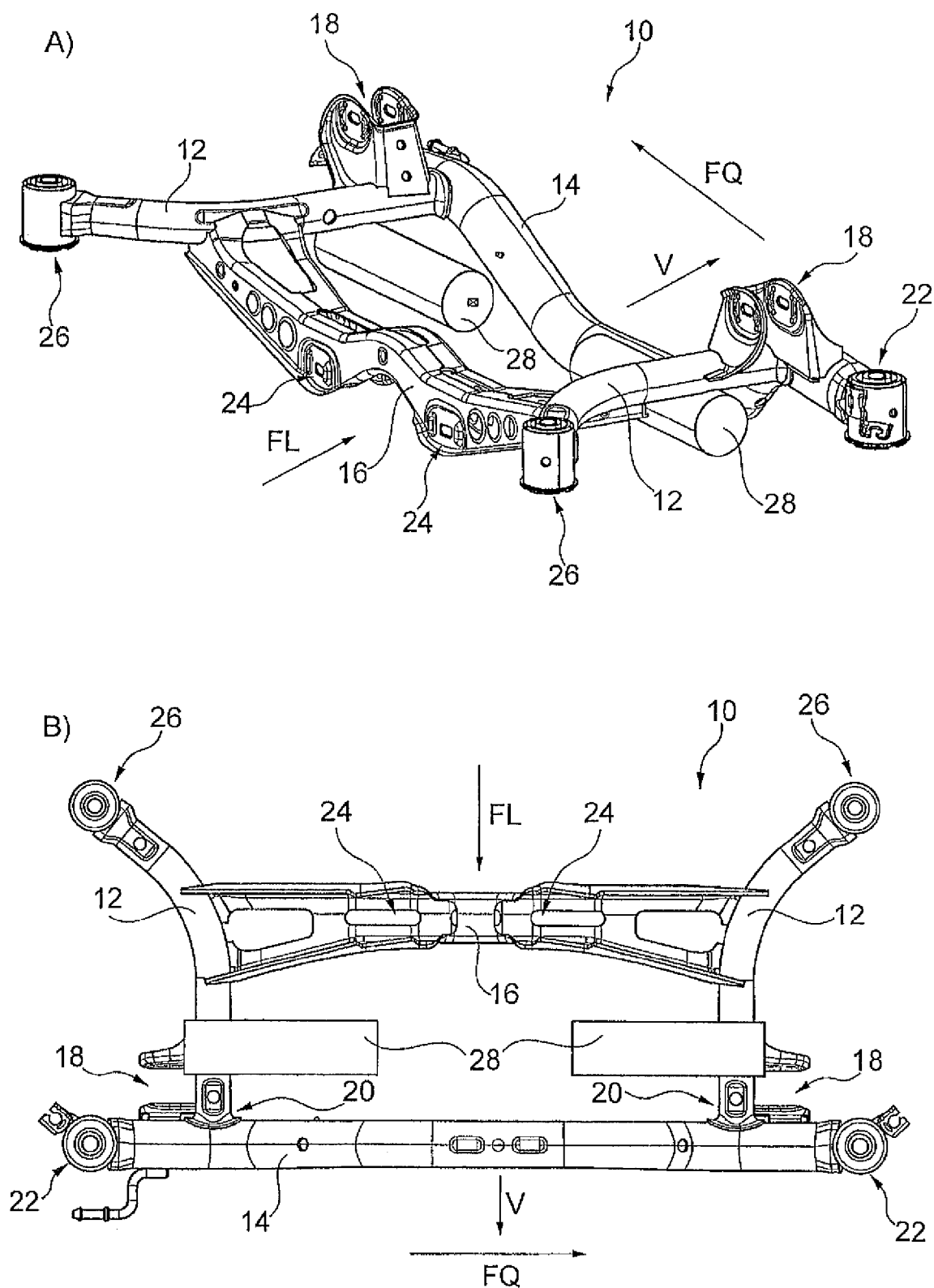
Figure 4:
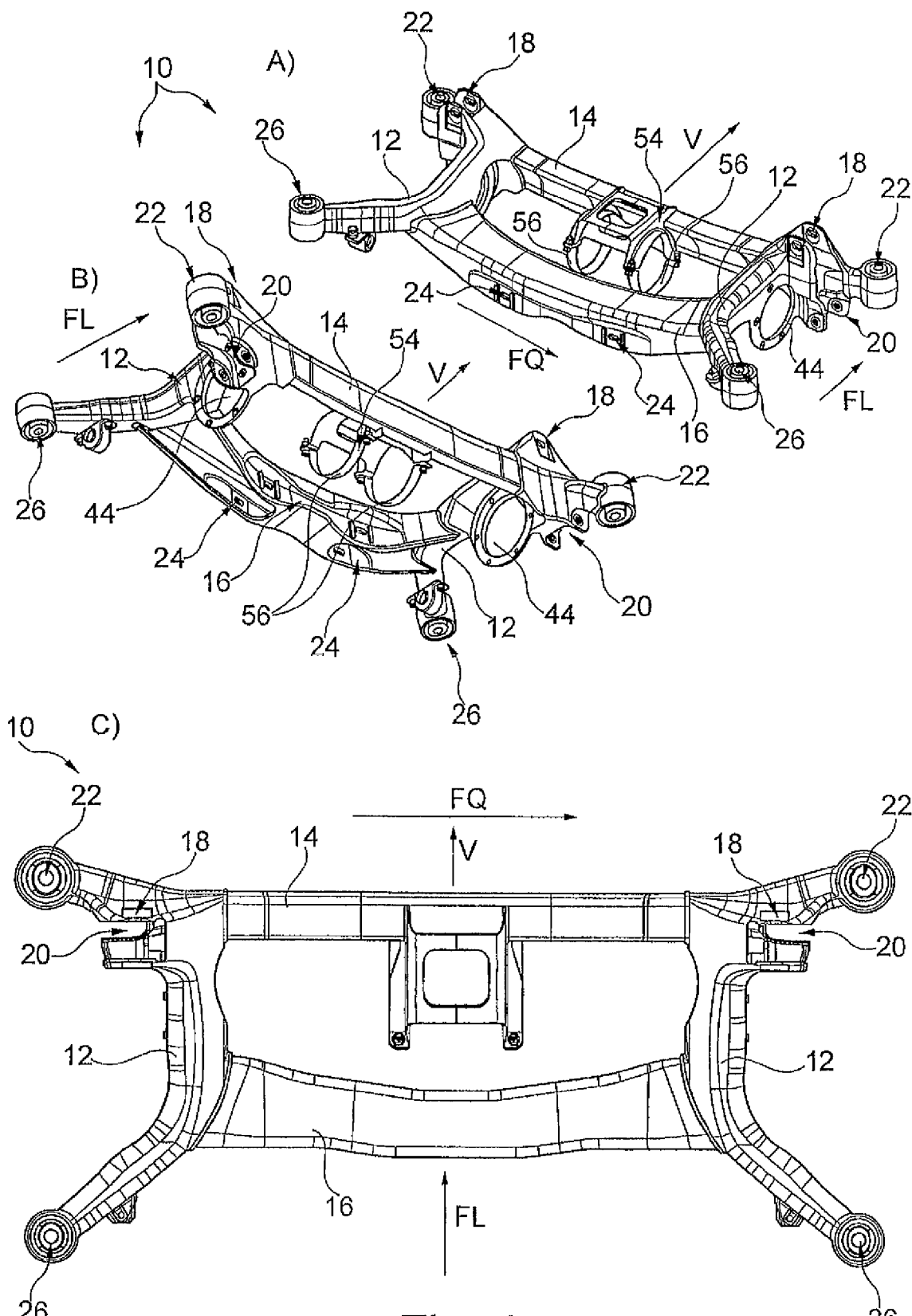
Figure 5:
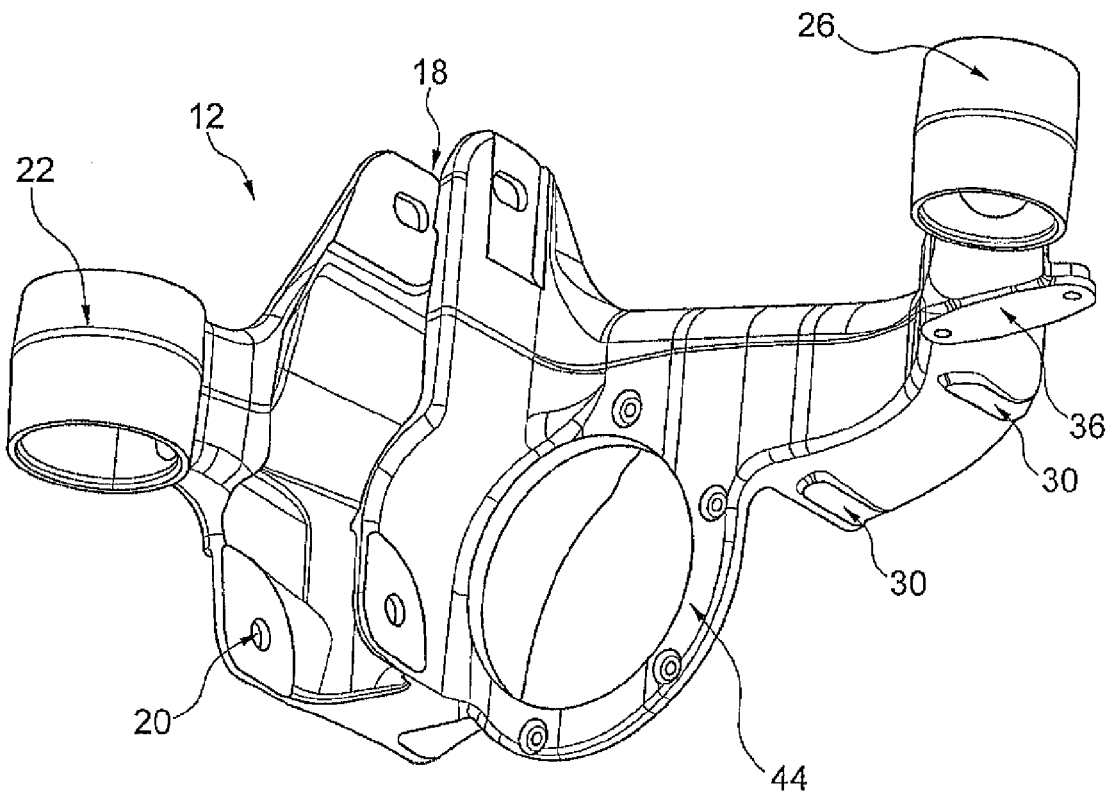
Figure 6:
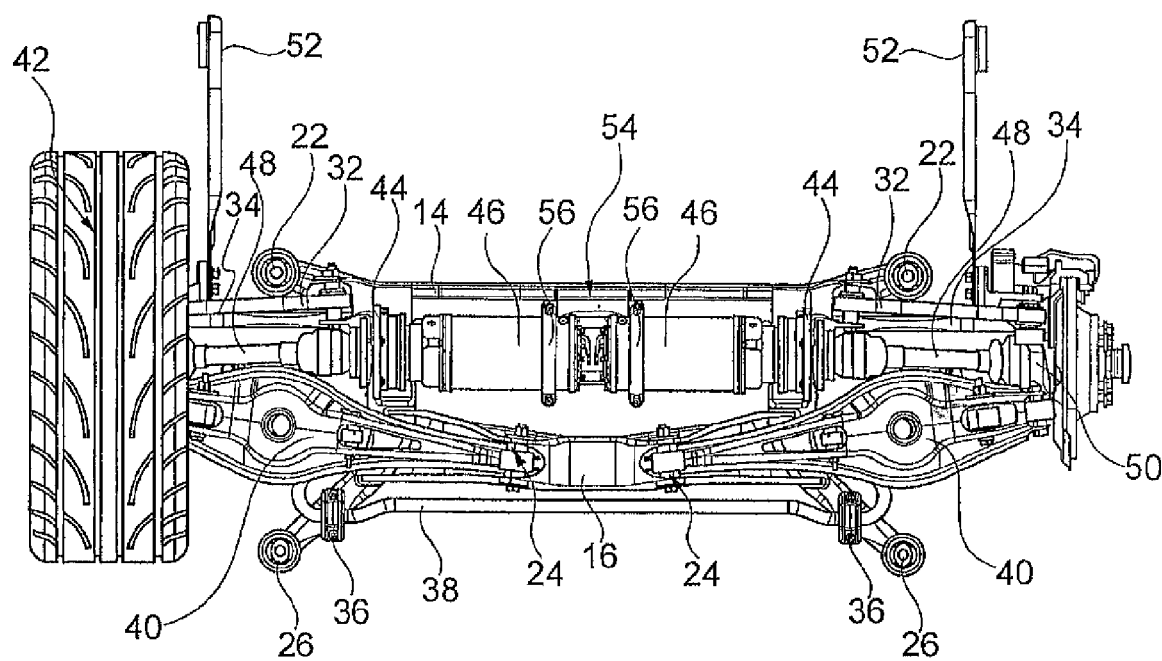
Figure 7:
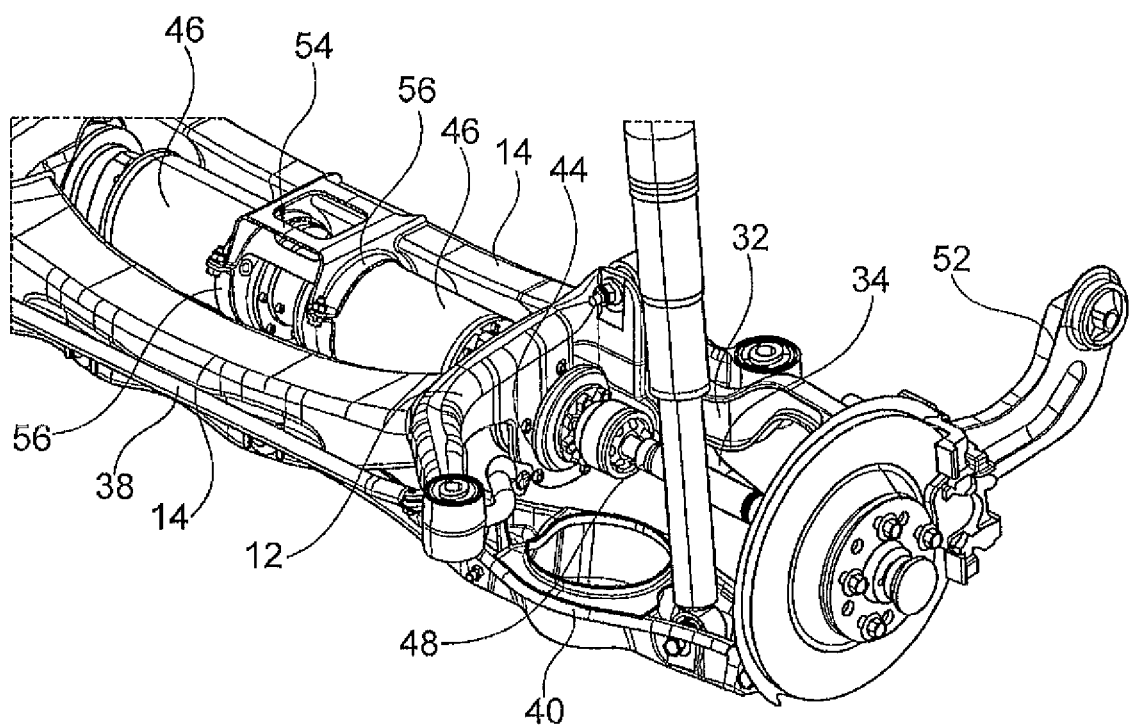

Further details and advantageous embodiments of the invention are evident from the following description, in conjunction with the drawing. The drawing shows:

FIG. 1 schematically, a first rear crossmember having a receiving arrangement disposed according to the invention, in A) a perspective view, and B) in a view from the bottom, FIG. 2 schematically, a second rear crossmember having a receiving arrangement disposed according to the invention, in A) a perspective view, and B) in a view from the bottom, FIG. 3 schematically, a third rear crossmember having a receiving arrangement disposed according to the invention, in A) a perspective view, and B) in a view from the bottom, FIG. 4 schematically, a fourth rear crossmember having a receiving arrangement disposed according to the invention, in A) a perspective view at a slant from above, B) in a perspective view at a slant from below, and C) in a top view, FIG. 5 a side member of the crossmember according to the invention according to FIG. 4, FIG. 6 the crossmember according to the invention, according to FIG. 4, in a view from the bottom, with assemblies disposed on it, and FIG. 7 a partial detail of the crossmember according to the invention, according to FIG. 4, in a perspective view, with assemblies disposed on it.

In order to avoid repetition, the same reference symbols are used in the figures, if these indicate the same components. The longitudinal vehicle direction of the motor vehicle is shown with an arrow FL, and the transverse vehicle direction is shown with an arrow FQ.

The crossmember 10 shown in FIGS. 1 to 3 has two side members 12 that extend essentially in the longitudinal vehicle direction FL, as well as a first transverse member 14 and a second transverse member 16. The two transverse members 14 and 16 connect the side members 12 in the transverse vehicle direction FQ. In the exemplary embodiment of a crossmember 10 shown, the first transverse member 14 lies in front of the second transverse member 16, with reference to the forward direction of travel V.

The side members 12 have a receiving site 18 for an upper transverse link, not shown here, in the region of the connection locations to the first transverse member 14, in each instance, which site is preferably connected with the side member 12 in one piece and lies on top.

A bearing location 20 that lies underneath and is preferably connected with the side member 12 in one piece serves for attaching a lower transverse link, not shown here, or a stabilizer, not shown here.

On the transverse member 14 that lies in the front in the forward direction of travel V, connection locations 22, preferably connected with the transverse member 14 in one piece, for attaching the crossmember 10 to the vehicle superstructure, not shown here, are provided in the end region.

The crossmember 10 furthermore comprises the second transverse member 16 that has already been mentioned and extends between the two side members 12.

On the second transverse member 16, there are bearing locations 24 for wheel guide links, also preferably connected with the transverse member 16 in one piece. These bearing locations 24 are disposed in a central section and serve for connecting a link that can be pivoted away downward, not shown here.

Toward the rear, the crossmember 10 is terminated by means of two further connection locations 26 for attaching it to the vehicle superstructure. These are preferably integrated into an end section of a side member 12, in one piece, in each instance.

The crossmember 10 shown in FIGS. 1 to 3, seen in the longitudinal vehicle direction FL, has a receiving arrangement 28, close to the wheel, connected with the side member 12, at the height of the wheel, not shown here, in each instance, for a drive, not shown here, which preferably comprises an electric motor, whereby the drive stands in an active connection with the corresponding wheel by way of a drive shaft, which can have an articulating angle, depending on the configuration and placement of the receiving arrangement. Each wheel is carried by a wheel support, not shown here, which is connected with the crossmember 10 by way of the aforementioned transverse links. The wheel support is furthermore connected with the vehicle superstructure with a longitudinal link or blade, not shown here, in the longitudinal direction, so as to rotate.

The receiving arrangements 28 shown in FIGS. 1 to 3 differ in terms of their diameter/length ratio, as a function of their placement on or in the side member 12. The receiving arrangements 28 shown have a cylindrical housing, in each instance, in which the drive of each wheel is accommodated.

Each of the wheels of the multi-link rear axle that has the crossmember 10 according to the invention is driven by a single electric motor. Preferably, each of the individually driven wheels can be controlled separately, in this connection, making it possible to transfer different drive forces and to implement an electronic stability program as well as to regulate the driving dynamics.

It is advantageous if at least individual ones of the receiving sites 18, 20, 22, 24, and 26 can be connected with one another in one piece, by means of casting, in the crossmember 10 according to the invention.

According to FIGS. 1 to 3, the crossmember 10 according to the invention has receiving arrangements 28 that are preferably produced in one piece with the crossmember 10, in each instance, or at least with the side members 12, preferably by means of casting.

The receiving arrangements 28 comprise a cylindrical or tubular hollow body, in each instance, disposed transverse to the longitudinal direction of travel FL, in which body a wheel drive is disposed.

According to the invention, it is also possible that the receiving arrangements 28 or parts thereof, particularly the tubular hollow body, are laid into a casting mold in a predetermined position. Subsequently, casting of the crossmember 10, which is cast in one piece, or of the side member 12, which is cast in one piece, takes place, in such a manner that the tubular hollow body of the receiving arrangement 28 is cast into, onto and/or around in the crossmember 10.

The first variant, shown in FIG. 1, shows a receiving arrangement 28, in the present case, the longitudinal axis of which, seen in the transverse vehicle direction FQ, is disposed at the height of the side member 12. The receiving arrangement 28 disposed in such a manner is configured to be relatively short, in comparison with the receiving arrangements 28 shown in FIGS. 2 and 3, and advantageously requires hardly any adaptation of the construction space. As a result, the receiving arrangement 28 has a comparatively small volume, but might make the use of very short drive shafts having a large articulation angle necessary.

The second variant, shown in FIG. 2, shows a receiving arrangement 28, the longitudinal axis of which, seen in the transverse vehicle direction, is disposed slightly below the height of the side member 12. The receiving arrangement 28 disposed in such a manner is configured to be longer in the longitudinal direction and greater in diameter in comparison with the receiving arrangement 28 shown in FIG. 1, on the one hand, and on the other hand, is configured to be shorter in the longitudinal direction and smaller in diameter in comparison with the receiving arrangement 28 shown in FIG. 3. As a result, this receiving arrangement 28 has a comparatively great volume, whereby the suitability for accommodating a common drive is particularly advantageous.

The third variant, shown in FIG. 3, shows a receiving arrangement 28, the longitudinal axis of which, seen in the transverse vehicle direction, is disposed even further below the height of the side member 12. The receiving arrangement 28 disposed in such a manner is configured to be longer in the longitudinal direction and smaller in diameter in comparison with the receiving arrangements 28 shown in FIGS. 1 and 2. As a result, this receiving arrangement 28 has a comparatively medium volume, which, however, can be increased even further by lengthening the receiving arrangement 28.

The invention is not restricted to the exemplary embodiment, but rather is variable in many ways, within the scope of the disclosure. All the new individual and combination characteristics disclosed in the description and/or the drawing can be essential to the invention.

The crossmember 10 shown in FIG. 4 as well as 6 and 7 has two side members 12 that extend essentially in the longitudinal vehicle direction FL, as well as a first transverse member 14 and a second transverse member 16. The side members 12 can have the configuration shown in FIG. 5, according to the invention. The two transverse members 14 and 16 connect the side members 12 in the transverse vehicle direction FQ. In the exemplary embodiment of a fourth crossmember 10 according to the invention that is shown, the first transverse member 14 lies in front of the second transverse member 16, with reference to the forward direction of travel V.

The side members 12 are preferably components cast in one piece, which are preferably produced from light metal, particularly from aluminum or an aluminum alloy, and particularly preferably using the sand-casting method. The first transverse member 14 is configured as a profile part, preferably as an extruded profile, particularly from a slight bent light metal, particularly from aluminum or an aluminum alloy. The second transverse member 16 is configured as a profile part, preferably as an interior high-pressure formed component, particularly from light metal, particularly from aluminum or an aluminum alloy, whereby the interior high-pressure formed part can advantageously be subsequently machined.

The side members 12 and transverse members 14, 16 are preferably welded to one another, whereby receiving sites, for example in the form of sleeve stumps, can advantageously be provided on the side members 12, for accommodating the transverse members 14, 16. In place of the aforementioned receiving sites, however, weld seam preparations 30 can also be provided on the side member 12, at predetermined positions.

The side members 12, according to the invention, of the fourth crossmember 10, according to the invention, have a receiving site 18 for a link, particularly the transverse link or roll-over strut 32 shown in FIGS. 6 and 7, approximately in the region of their connection locations to the first transverse member 14, in each instance, which site is preferably connected with the side member 12 in one piece and lies on top.

A bearing location 20 that lies underneath and is preferably connected with the side member 12 in one piece serves for attaching a further link, particularly a transverse link or a tie rod 34, as it is shown in FIGS. 6 and 7, for example.

Furthermore, the side member 12 can advantageously also have a receiving site 36 for mounting or attaching a stabilizer 38, as it is shown in FIGS. 6 and 7, for example. The receiving site 36 for mounting or attaching a stabilizer 38 can advantageously be provided on the underside of the side member 12, preferably in the region of the connection location 26 for attachment to the vehicle superstructure, disposed at the rear on the side member 12.

On the end region of the side member 12 that lies at the front in the forward direction of travel V, a connection location 22 for attaching the crossmember 10 to the vehicle superstructure, not shown here, can be provided, which site is preferably connected with the side member 12 in one piece.

The crossmember 10 furthermore comprises the second transverse member 16 that has already been mentioned and extends between the two side members 12.

Preferably, bearing locations 24 for wheel guide links, particularly the spring link 40 shown in FIGS. 6 and 7, are situated on the second transverse member 16, preferably connected with the transverse member 16 in one piece. These bearing locations 24 are disposed in a central section of the transverse member 16 and serve for connecting a link 40 that can be pivoted away downward.

Toward the rear, the fourth crossmember 10 according to the invention is terminated by two further connection locations 26 for attaching to the vehicle superstructure. These are preferably integrated into an end section of a side member 12, in one piece, in each instance.

The crossmember 10 shown in FIG. 4 as well as FIGS. 6 and 7 and the side member 12 shown in FIG. 5 have a receiving arrangement 44 close to the wheel, for a drive 46, which preferably comprises an electric motor, which arrangement is connected with the side member 12, preferably in one piece, approximately at the height of the wheel 42, in each instance, seen in the longitudinal direction of the vehicle FL, whereby the drive 46 stands in an active connection with the corresponding wheel 42 by way of a drive shaft 48, which can have an articulating angle, depending on the configuration and placement of the receiving arrangement 44. Each wheel 42 is carried by a wheel support 50, which is connected with the crossmember 10 by way of the aforementioned links or transverse links 32, 34 or 40. The wheel support 50 is furthermore connected with the vehicle superstructure with a longitudinal link or blade 52, on the longitudinal direction, so as to rotate.

The receiving arrangement 44 shown in FIGS. 4 to 7 is advantageously a type of ring flange on which the drive 46 is attached or accommodated. For this purpose, the housing of the drive is advantageously connected with the receiving arrangement 44, particularly screwed onto it, in such a manner that the drive shaft of the drive 46 passes through the opening of the ring flange. It is advantageous if ring flange and wheel 42 are disposed essentially parallel to one another.

Such a flange-like receiving arrangement 44, integrated into the side member 12, guarantees support of the drive torque.

The receiving arrangement 44 shown is therefore connected with the one side of the cylindrical housing of the drive 46. The other side of the drive housing is also fixed in place on the fourth crossmember 10 according to the invention. For this purpose, a further receiving arrangement 54 for the drive 46 can be provided on the first transverse member 14. This receiving arrangement 54 is preferably disposed in the central region of the first transverse member 14. In this connection, this can preferably be a welded construction, preferably made from a light metal, particularly from aluminum or an aluminum alloy. The construction welded onto the first transverse member 14 can advantageously be composed of one or more bent profiles, particularly metal sheets. It is advantageous if the construction has clamp 56 or the like, with which the end of the drive 46 or drive housing that faces away from the wheel 42 can be fixed in place.

Each of the wheels 42 of the multi-link rear axle that has the crossmember 10 according to the invention is driven by an individual drive 46 or electric motor. Preferably, each of the individually driven wheels 42 can be controlled separately, in this connection, thereby making it possible to transfer different drive forces and to implement an electronic stability program as well as to regulate the driving dynamics.

It is advantageous if at least individual ones of the receiving sites 18, 20, 22, 26, and 36 can be connected with one another, in one piece, in the side member 12 according to the invention, by means of casting, particularly using the sand-casting method.

According to FIGS. 4 to 7, the side member 12 according to the invention has a receiving arrangement 44 that is produced, preferably in one piece with the side member 12, by means of casting, particularly using the sand-casting method. The receiving arrangement 44 has a ring-like flange disposed transverse to the longitudinal vehicle direction FL, in which the wheel drive 46 is disposed or with which the wheel drive 46 is connected.

The drive 46 shown in FIGS. 6 and 7, connected with the receiving arrangement 44 and the receiving arrangement 54, is advantageously disposed in a tubular housing, the longitudinal axis of which, seen in the transverse vehicle direction FQ, is disposed slightly below the height of the side member 12 or of the axis of rotation of the wheel 42.

The drive 46 can advantageously be a water-cooled, so-called high-speed synchronous motor, which can be preceded, toward the wheel 42, by a planetary gear mechanism. A drive shaft 48 that passes through the ring flange of the receiving arrangement 44 stands in an active connection with the wheel 42 with fixed ball joints and shift equalization.

Of course, the invention is not restricted to the fourth exemplary embodiment, but rather is variable in many ways, within the scope of the disclosure. All the new individual and combination characteristics disclosed in the description and/or the drawing can be essential to the invention.

The invention claimed is:

1. Crossmember for multi-link suspension of the wheels of a motor vehicle, wherein the crossmember comprises two side members that are connected with one another by way of at least one transverse member,
    wherein a respective receiving arrangement for a respective drive motor for each of the wheels is disposed on each of the two side members,
    wherein the side members are configured as components cast in one piece with at least a part of the respective receiving arrangement, wherein the part of the respective receiving arrangement is configured as a housing for the respective drive motor, wherein the side members form at least a part of the housing, and wherein proceeding from a connection point between the housing and the side member the greatest part of the housing of the drive motor is disposed to be directed inward, in other words is disposed to face away from the corresponding driven wheel and towards the opposing side member.

2. Crossmember according to claim 1, wherein the two side members are connected, by way of two transverse members, to form a frame-shaped crossmember.

3. Crossmember according to claim 1, wherein a front transverse member, in the direction of travel, has at least one receiving arrangement for fixation or holding of at least one drive.

4. Crossmember according to claim 3, wherein the receiving arrangement of the front transverse member is disposed in the central region of the front transverse member.

5. Crossmember according to claim 3 wherein the receiving arrangement of the front transverse member is disposed on that side of the front transverse member that faces toward an opposite transverse member.

6. Crossmember according to claim 3, wherein the receiving arrangement of the front transverse member has at least one holder per drive.

7. Crossmember according to claim 1, wherein the receiving arrangement for the drive motor is configured in multiple parts.

8. Crossmember according to claim 1, wherein the receiving arrangements present on the side members are configured in the manner of a respective flange.

9. Crossmember according to claim 1, wherein the housing for the drive motor is configured in cylindrical, tubular, sleeve or box shape.

10. Crossmember according to claim 1, wherein the drive motor is held or fixed in place on or in the crossmember on one side on the side member by way of the receiving arrangement and on the other side on the transverse member by way of the receiving arrangement.

11. Crossmember according to claim 1, wherein the axes of rotation of wheel and drive motor coincide.

12. Crossmember according to claim 1, wherein the receiving arrangement for the drive motor is disposed above, below, or at the height of the wheel center, seen in the transverse vehicle direction.

13. Crossmember according to claim 1, wherein the receiving arrangement is disposed in front of, behind, or at the height of the wheel center, seen in the longitudinal vehicle direction.

14. Crossmember according to claim 1, wherein the crossmember, the side member and/or the receiving arrangement are produced, at least in part, from a light material.

15. Crossmember according to claim 14, wherein the light material is a light metal, a plastic, or a composite of light metal and plastic.

16. Crossmember according to claim 15, wherein the light metal consists of aluminum, magnesium, zinc or alloys with one or more of these metals.

17. Crossmember according to claim 15, wherein the plastic is a polyamide.

18. Crossmember according to claim 1, wherein at least a part of the receiving arrangement has one or more reinforcement elements.

19. Crossmember according to claim 18, wherein one or more reinforcement elements make a transition into the side member.

20. Crossmember according to claim 1, wherein the drive motor is an electric motor.

21. Crossmember according to claim 1, wherein at least a part of the receiving arrangement and/or a cast component of the crossmember is produced via at least one process selected from the group consisting of squeeze-casting, counter-pressure die-casting (CPC), high-pressure die-casting, thixocasting, rheocasting, low-pressure sand-casting, and gravity die-casting.

22. Crossmember according to claim 1, wherein at least a part of the receiving arrangement and/or a cast component of the crossmember is/are produced using the injection-molding method.

23. Crossmember according to claim 1, wherein at least a part of the receiving arrangement and/or a cast component of the crossmember is/are produced using the sand-casting method.

24. Crossmember according to claim 1, wherein the crossmember is part of a driven rear axle of a two-axle or multi-axle motor vehicle.

25. Crossmember according to claim 24, wherein the multi-link rear axle is configured as a control blade rear axle.

26. Crossmember according to claim 1, wherein the crossmember, the side member and/or the receiving arrangement are configured, at least in part, as an injection-molded, extruded, continuously cast or cast profile.

27. Crossmember according to claim 1, wherein the longitudinal axis or axis of symmetry of the receiving arrangement is disposed to be parallel to the axis of rotation of the wheels or coincides with this axis.

28. Crossmember according to claim 1, wherein the receiving arrangement present on the side member is disposed close to the wheel.

29. Crossmember according to claim 1, wherein the longitudinal axis of the receiving arrangement is disposed above, below, or at the height of the crossmember or of the side member, seen in the transverse vehicle direction.

30. Crossmember according to claim 1, wherein the receiving arrangement or the housing of the drive motor has a volume of 500 cm$^3$ to 2000 cm$^3$.

31. Crossmember according to claim 1, wherein the diameter/length ratio of the receiving arrangement or of the housing for the drive motor amounts to between 0.25:1 and 1.5:1.

32. Crossmember according to claim 1, wherein the side member has at least some of the following receiving sites, which are connected with the side member in one piece:
 1. receiving sites for mounting an upper transverse link,
 2. receiving sites for mounting a lower transverse link,
 3. receiving sites for mounting a stabilizer, and
 4. receiving sites for attaching the crossmember to the body or to the superstructure.

33. Crossmember according to claim 6, wherein the holder is configured in the manner of a clamp.

34. Crossmember for multi-link suspension of the wheels of a motor vehicle, wherein the crossmember comprises two side members that are connected with one another by way of at least one transverse member, wherein a respective receiving arrangement for the drive of each of the wheels is disposed on each of the two side members, wherein the side members are configured as components cast in one piece with at least a part of the respective receiving arrangement, wherein the part of the respective receiving arrangement is configured as a housing for the drive, wherein the side members form at least a part of the housing, wherein proceeding from a connection point between the housing and the side member the greatest part of the housing of the drive is disposed to be directed inward, in other words is disposed to face away from the corresponding driven wheel and towards the opposing side member, wherein at least one transverse member has at least one receiving arrangement for fixation or holding of at least one drive, and wherein the receiving arrangement of the transverse member is disposed on that side of the transverse member that is closest to the axis of rotation of the wheel.

* * * * *